United States Patent
Ahmadi-Ardakani (10) Patent No.: US 10,715,624 B2
(45) Date of Patent: Jul. 14, 2020

(54) OPTIMIZED N-STREAM SEQUENTIAL MEDIA PLAYBACK CACHING METHOD AND SYSTEM

(71) Applicant: Western Digital Technologies, Inc., San Jose, CA (US)

(72) Inventor: Arya Ahmadi-Ardakani, Mission Viejo, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 94 days.

(21) Appl. No.: 15/840,816

(22) Filed: Dec. 13, 2017

(65) Prior Publication Data

US 2018/0109644 A1 Apr. 19, 2018

Related U.S. Application Data

(63) Continuation of application No. 14/146,194, filed on Jan. 2, 2014, now Pat. No. 9,871,882.

(51) Int. Cl.
*G06F 15/167* (2006.01)
*H04L 29/08* (2006.01)

(52) U.S. Cl.
CPC ............... *H04L 67/2857* (2013.01)

(58) Field of Classification Search
CPC ..................................... G06F 15/167
USPC ........................................... 709/216
See application file for complete search history.

(56) References Cited

U.S. PATENT DOCUMENTS

| | | | |
|---|---|---|---|
| 6,625,750 B1 * | 9/2003 | Duso | G06F 11/2028 714/11 |
| 2002/0069420 A1 * | 6/2002 | Russell | G06F 21/10 725/92 |
| 2009/0180549 A1 * | 7/2009 | Hosein | H04L 1/0014 375/240.25 |
| 2014/0351871 A1 * | 11/2014 | Bomfim | H04L 65/4084 725/93 |

* cited by examiner

*Primary Examiner* — Vivek Srivastava
*Assistant Examiner* — Sibte H Bukhari
(74) *Attorney, Agent, or Firm* — Chang & Hale LLP (57) ABSTRACT

A method of caching data for a set of streams serviced from a data storage device, said method including receiving requests for a set of streams, determining a number of zones in a cache based on the number of streams requested, determining a respective consumption rate for each stream, and allocating the zones in the cache with respective sizes such that the zones are scheduled to be refreshed within a same active operation period of the data storage device.

20 Claims, 6 Drawing Sheets

OPTIMIZED N-STREAM SEQUENTIAL MEDIA PLAYBACK CACHING METHOD AND SYSTEM

CROSS-REFERENCE TO RELATED APPLICATIONS

The present application is a continuation of U.S. patent application Ser. No. 14/146,194 filed on Jan. 2, 2014, entitled OPTIMIZED N-STREAM SEQUENTIAL MEDIA PLAYBACK CACHING METHOD AND SYSTEM, the disclosure of which is hereby incorporated by reference in its entirety.

BACKGROUND

A data storage device may provide one or more streams to one or more hosts. To improve performance, portions of the one or more streams may be stored in a cache. However, the cache may have limited space, and thus the cache may be allocated to one or more streams. The portions of the cache allocated to the one or more streams may refresh at different points, which require the data storage device to activate or spin up a storage media at different times. This can increase power consumption.

Furthermore, with the limited cache space, when additional streams are requested, the data storage device may not effectively allocate cache space to service the additional streams. This may result in performance degradation or inefficient use of the cache.

BRIEF DESCRIPTION OF THE DRAWINGS

The features and advantages of the present embodiments will become more apparent from the detailed description set forth below when taken in conjunction with the drawings, wherein.

DETAILED DESCRIPTION

Figure 1:
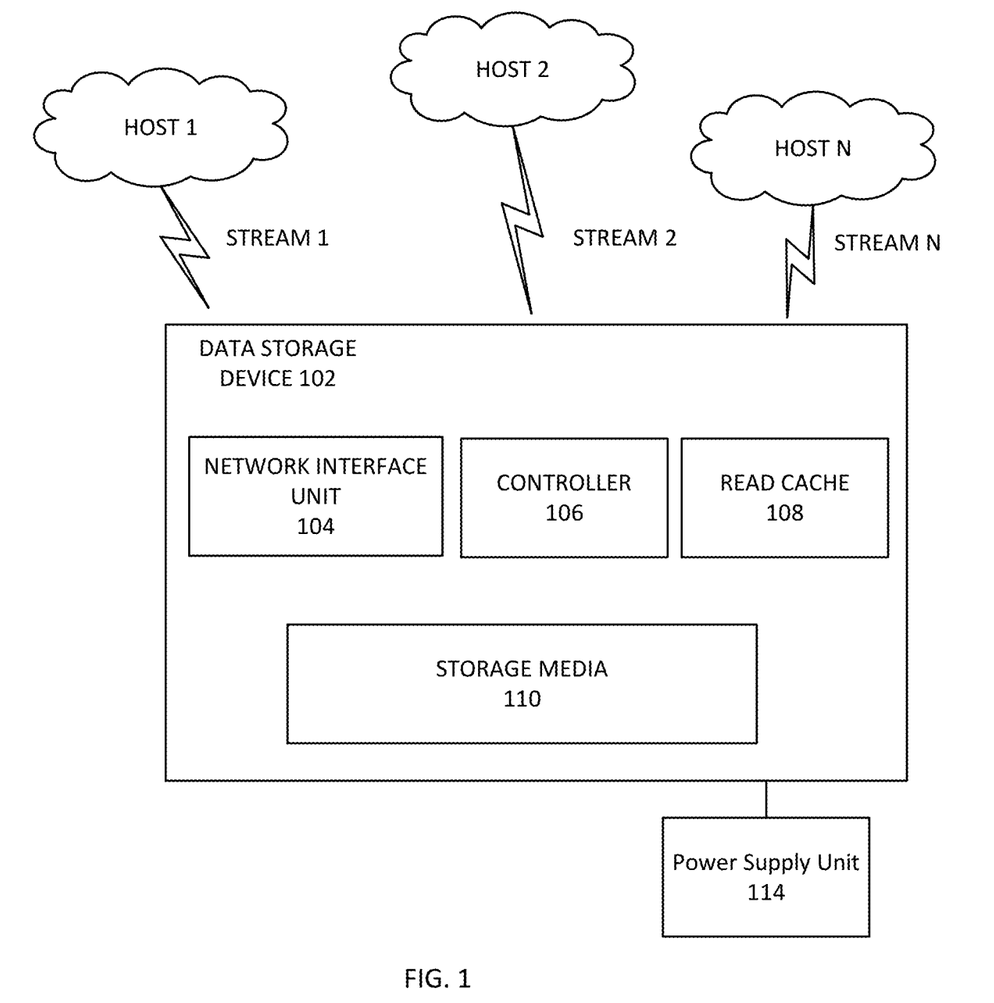
FIG. 1 depicts a data storage device according to an embodiment.

In an embodiment shown in FIG. 1, a data storage device 102 is configured to transmit one or more streams to one or more hosts. The data storage device 102 can transmit, for example, stream 1 through stream N to host 1 through host N, respectively. In an embodiment, N is an integer.

In the embodiment shown in FIG. 1, the data storage device 102 may be powered by a power supply unit 114. In an embodiment, the power supply unit 114 comprises a battery. However, in an embodiment, the power supply unit 114 could comprise another host, an electric outlet, or other devices which may supply power to the data storage device 102. In an embodiment, the power supply unit 114 can be part of the data storage device 102. However, in an embodiment, the power supply unit 114 can be separate from the data storage device 102.

In an embodiment, the data storage device 102 comprises a network attached storage ("NAS") devices or a direct attached storage ("DAS") device. Furthermore, in an embodiment, the data storage device 102 is configured to be part of an electronic device such as a laptop, a computer, a set top box, a media player, a tablet, or other device which may need to store data.

In an embodiment, the data storage device 102 comprises a network interface unit 104, a controller 106, a read cache 108, and a storage media 110. In an embodiment the network interface unit 104 is configured to provide a connection between the one or more hosts and the data storage device 102. In an embodiment, the network interface unit 104 is configured to provide a wired connection or a wireless connection to the one or more hosts. In an embodiment, the network interface unit 104 comprises a wired interface unit, a wireless interface unit, or any combination thereof. In an embodiment, the network interface unit 104 need not be directly connected to the one or more hosts. Instead, the network interface unit 104 can connect to a network where the host resides, or to which the host is connected. In addition, in an embodiment, the network interface unit 104 can connect to the Internet.

In an embodiment, the storage media 110 is configured to store data for the data storage device 102. In an embodiment, the storage media 110 comprises a nonvolatile memory. For example, the storage media 110 can comprise a magnetic rotating disk, a solid state memory, or any combination thereof. In an embodiment, the storage media 110 is configured to store some or all of the one or more streams for playback to the one or more hosts. The storage media 110 can receive the streams from another host, a content source, a network, a cable television source, or other source which may supply the storage media 110 with data for the one or more streams.

In an embodiment, the read cache 108 is configured to also store data for the data storage device 102. However, in an embodiment, the read cache 108 is configured to have lower access latency than the storage media 110. In an embodiment, the read cache 108 may cost more per unit of storage space than the storage media 110. Thus, the read cache 108 may comprise less memory or less storage space than the storage media 110. In an embodiment, the read cache 108 comprises a volatile memory, such as dynamic random access memory ("DRAM"). In an embodiment, the read cache 108 is configured to store some or all of the one or more streams for playback to the one or more hosts. In an embodiment, the read cache 108 may receive portions or a copy of the streams from the storage media 110.

In an embodiment, the controller 106 may play back the streams by utilizing the storage media 110 and the read cache 108. For example, the controller 106 may perform a read operation where the stream is partially or completely cached in the read cache 108. The storage media 110 can then refresh the read cache 108 with additional data if the portion of the stream stored in the read cache 108 has already been played back by the data storage device 102.

Figure 2:
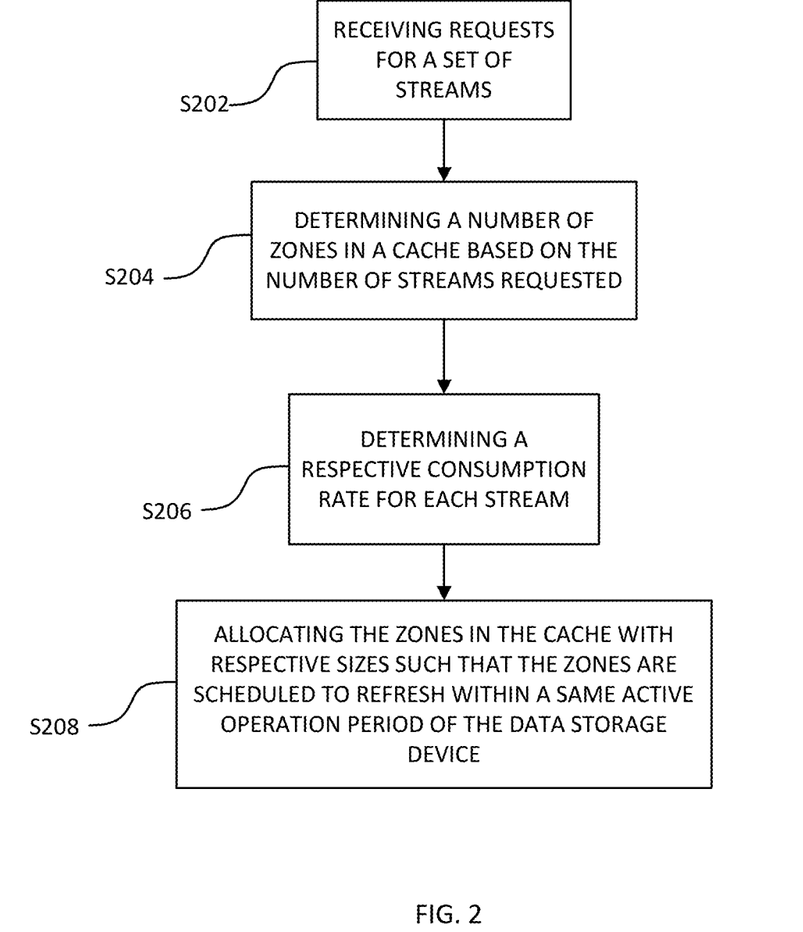
FIG. 2 depicts a process for caching data for a set of streams serviced from a data storage device according to an embodiment.

In an embodiment, a process for caching data for a set of streams serviced from the data storage device 102 is shown in FIG. 2. In block S202, the controller 106 can receive a request for a set of streams from one or more hosts, such as Hosts 1-N in the embodiment shown in FIG. 1. That is, in an embodiment, the controller 106 is configured to play back one or more streams at the same time. In an embodiment, the one or more streams comprise multimedia streams such as for audio or video.

In block S204, the controller 106 determines a number of zones in the read cache 108 based on the number of streams requested. For example, the controller 106 can divide the read cache 108 into multiple zones as seen in an embodiment shown in FIG. 3. In an embodiment the zones comprise dynamic zones. In that embodiment, the read cache 108 is divided into N number of zones for N streams. That is, Stream 1 would be allocated Zone 1, Stream 2 would be allocated Zone 2, Stream 3 would be allocated Zone 3, and Stream N would be allocated Zone N. In the embodiment shown in FIG. 3, the read cache 108 comprises a storage capacity of 2 gigabytes ("GB"). However, in an embodiment, the read cache 108 can comprise other storage capacities.

In block S206, the controller 106 determines a respective consumption rate for each stream. In an embodiment, the consumption rate comprises the amount of data consumed for a certain time period. For example, the consumption rate could comprise 5 MB/s, 10 MB/s, or any other rates for data consumption. In the embodiment shown in FIG. 3, Stream 1 may consume data at Rate 1, Stream 2 may consume data at Rate 2, Stream 3 may consume data at Rate 3, and Stream N may consume data at Rate N. In an embodiment, determining the respective consumption rate for each stream comprises determining a bitrate based on a requested media playback bitrate.

In block S208, the controller 106 allocates the zones in the read cache 108 with respective sizes such that the zones are refreshed within a same active operation period for the data storage device 102. Generally, data storage devices have several power states, including one or more low power states (e.g., sleep, hibernate, shutdown etc.) and one or more high power states when active operations (e.g., reads or writes) are occurring. By timing refilling of the zones to occur during a same active operation period, the instances high power states are entered and/or the amount of time spent in a high power state are reduced. This can help preserve battery life or otherwise reduce power consumption since the storage device spends less time in a high power state and/or less power is consumed moving from a low power state to a high power state (e.g., spinning up a hard disk drive).

In one embodiment, the zone sizes in the read cache 108 correspond to the data consumption rates. In the embodiment shown in FIG. 3, since Rate 2 is greater than Rate N, Zone 2 is larger than Zone N. Similarly, since Rate N is greater than Rate 1, Zone N is larger than Zone 1. Also, Rate 1 is greater than Rate 3, so Zone 1 is greater than Zone 3. In an embodiment, by sizing the zones by data consumption rate, the time that the Zones will need to be refreshed with data (e.g. when all data or substantially all data within the Zone is consumed) is substantially the same for all Zones.

Figure 3:
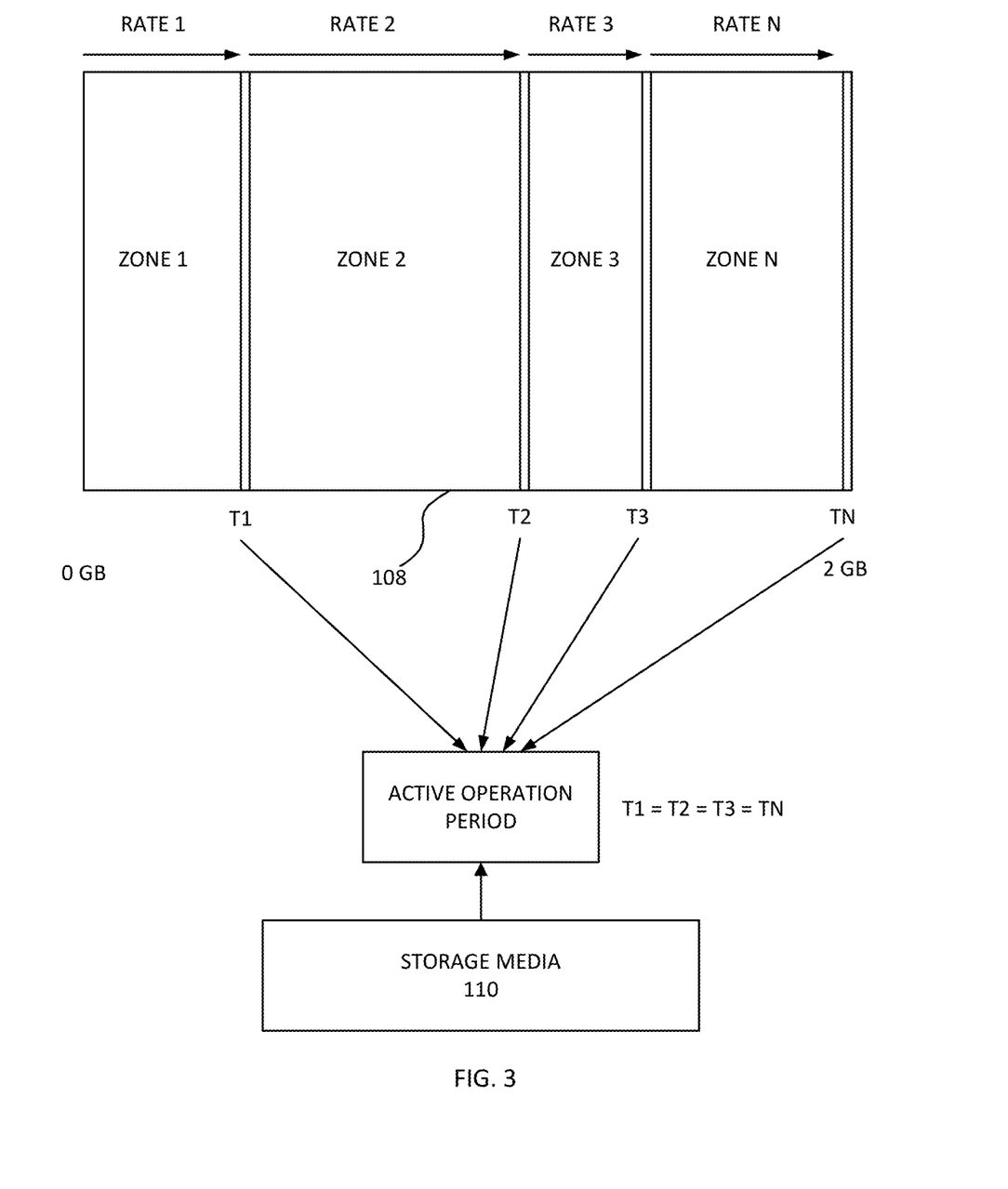
FIG. 3 depicts allocation of zones in a read cache according to an embodiment.

For example, at point T1, the Zone 1 will need to be refreshed, at point T2, the Zone 2 will need to be refreshed, at point T3, the Zone 3 will need to be refreshed, and at point TN, the Zone N will need to be refreshed. In an embodiment, the points T1=T2=T3=TN or are close enough that read operations can occur during the same active operation period for the data storage device. In another example scenario, the data storage device is in a low power state when T1 is reached, causing the data storage device to enter an active operation period. In many power implementations, data storage devices will remain in a high power state for a period of time, waiting for additional operations. During that active operation period, T2, T3 and TN are also reached. Because the data storage device is already in an active operation period, the data storage device avoids a power transition event (e.g., spinning up a drive), allowing power consumption to be reduced.

In an embodiment, T1, T2, T3, and TN represent the time it takes to consume the data in the Zones 1, 2, 3, and N, respectively before the data in Zones should be refreshed. Thus, the controller 106 can initiate a read operation for the Zones 1, 2, 3 and N during the same active operation period and pull data from the storage media 110 during the same period. In an embodiment, the time when each of the Zones 1, 2, 3, and N require a read operation is synchronized to occur at substantially the same time or at least during the same active operation period for the storage device 102.

In an embodiment, not all of the data in the Zones will be consumed before a refresh operation is performed. That is, a buffer can be utilized to ensure that the Zones will still contain data while the refresh operation is being performed in order to ensure a seamless playback experience for the user. In one embodiment, once a first Zone requires a refresh and causes the data storage device to enter an active operation period, other Zones will automatically be refreshed even if those Zones still have cached data in order to take advantage of the active operation period. Advantageously, this embodiment can compensate for situations where playback of one or more streams may have been paused, causing de-synchronization of the streams.

In an embodiment, this reduces an amount of power consumption for the data storage device 102 since the storage media 110 will not have to be activated for each of the Streams 1, 2, 3, and N. For example, in the case where the storage media 110 comprises a magnetic rotating disk, the magnetic rotating disk will not have to be spun up for each of the individual Streams 1, 2, 3, and N. This may be beneficial when the power supply unit 114 has a limited amount of power, such as when the power supply unit 114 comprises a battery. Furthermore, the reduction in power consumption by the data storage device 102 may increase the likelihood that the data storage device 102 may meet energy usage restrictions, regulations, or standards. In addition, the reduction in power consumption by the data storage device 102 may reduce the operational cost associated with the data storage device 102.

Figure 4:
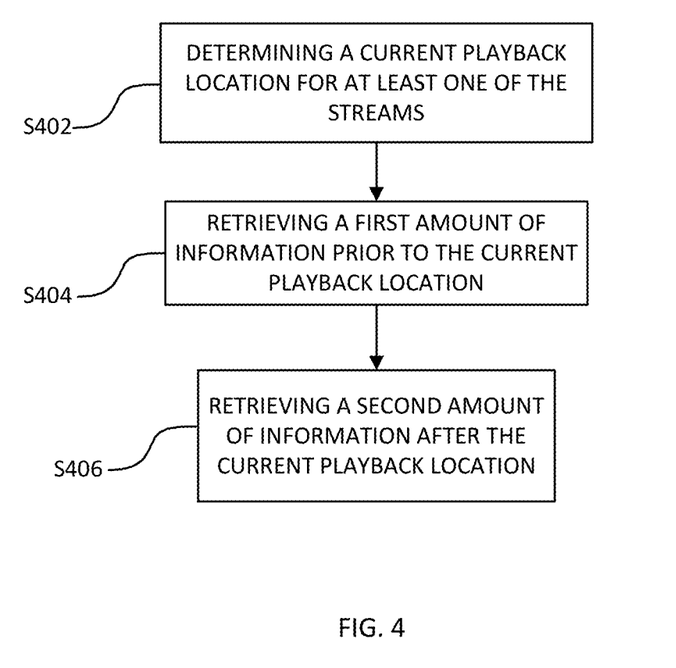
FIG. 4 depicts a process for re-allocating zones in a read cache according to an embodiment.

In the embodiment shown in FIG. 3, the read cache 108 is divided into N Zones for N Streams. However, if another stream is added, such as with N+1 Streams, the read cache 108 will be divided into N+1 Zones. In such a case, some portion of the previously allocated Zones will be allocated to the new Zone. In an embodiment, a process for re-allocating the Zones in the read cache 108 is shown in a process in FIG. 4. In block S402, the controller 106 determines a current playback location for at least one of the streams. For example, in the embodiment shown in FIG. 5, a request for Stream 2 occurs such that Stream 2 from a host will be played back in addition to Stream 1. Thus, the controller 106 allocates the previously singular Zone into two Zones. However, the exact location for allocation will be determined by the controller 106.

Figure 5:
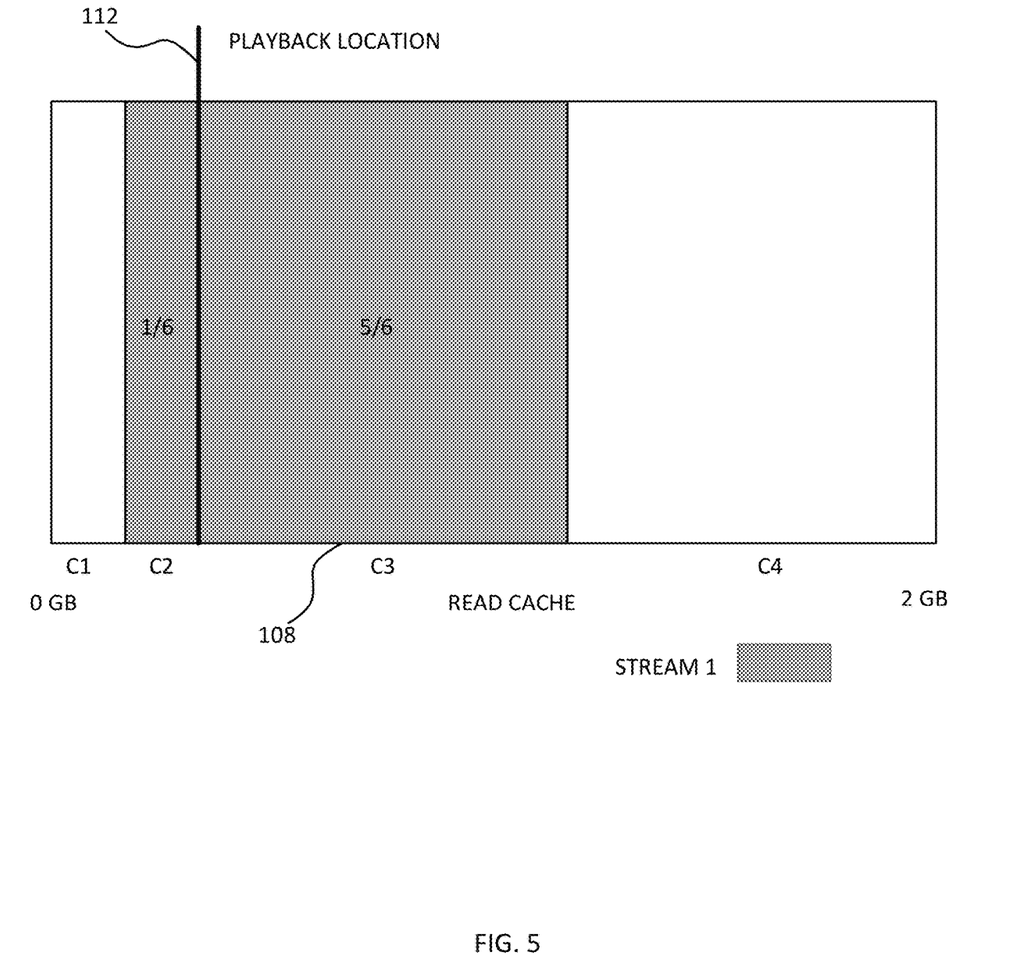
FIG. 5 depicts re-allocation of zones in a read cache according to an embodiment.

FIG. 5 illustrates an example logical memory layout on the read cache for streaming data. While the logical memory layout shows the streaming data as contiguous, the physical layout, due to placement by a memory management system, may be different. For example, data for a single file may be split into non-contiguous physical memory locations. In the embodiment shown in FIG. 5, the controller 106 determines a current playback location 112. The current playback location 112 can be, for example, where the Stream 1 is being played back by the data storage device 102. That is, location to the left of the playback location 112 comprises data which has already been played back by the data storage device 102, and the location to the right of the playback location 112 comprises data which has not yet been played back by the data storage device 102.

In block S404, the controller 106 retrieves a first amount of information prior to the current playback location 112. For example, the first amount of information retrieved is indicated as chunk C2 in the embodiment shown in FIG. 5. In block S406, the controller 106 retrieves a second amount of information prior to the current playback location 112. For example, the second amount of information retrieved is indicated as chunk C3 in the embodiment shown in FIG. 5. Thus, the chunks C2 and C3 will form part of or all of Zone 1 for the Stream 1, while the remaining chunks C1 and C4 will form part of or all of Zone 2 for the newly requested Stream 2. In an embodiment, Zone 2 need not utilize all of chunk C1 and chunk C4, but instead can utilize part of chunk C1 and/or chunk C4.

In the embodiment shown in FIG. 5, the amount of data retained in Zone 1 is set so that chunk C2 comprises data for the newly allocated Zone 1 prior to the playback location 112 and the chunk C3 is data for the newly allocated Zone 1 after the playback location 112. In an embodiment, the chunk C2 comprises 1/6 of the newly allocated Zone 1 and chunk C2 comprises 5/6 of the newly allocated Zone 1. In an embodiment, the chunk C2, or the first amount of information requested, comprises approximately 15% of the newly allocated Zone 1. In an embodiment, the chunk C3, or the second amount of information requested, comprises approximately 85% of the newly allocated Zone 1.

In an embodiment, this size differential between the chunk C2 and the chunk C3, a ratio of the size of the chunk C2 to the newly allocated Zone 1, or a ratio of the size of the chunk C3 to the newly allocated Zone 1 is based on a Poisson distribution. In an embodiment this can increase the likelihood that the data requested for the Stream 1 is located in the read cache 108 since a user is more likely to view a multimedia file sequentially. For example, a user is more likely to view a portion of a movie 10 minutes in the future (and utilize 10 minutes worth of data after the playback location 112), than a portion of the movie 10 minutes in the past (and utilize 10 minutes worth of data before the playback location 112). In an embodiment, instead of a Poisson distribution, Hypergeometric distributions may be used.

In the embodiment shown in FIG. 5, Zone 1 and Zone 2 are approximately the same size since the consumption rate for Stream 1 and Stream 2 are equivalent. However, the size for Zone 1 and Zone 2 need not be the same, but the allocation principals disclosed above can be utilized to allocate space for Zone 1 and Zone 2 even when the size of Zone 1 and Zone 2 are not the same.

Figure 6:
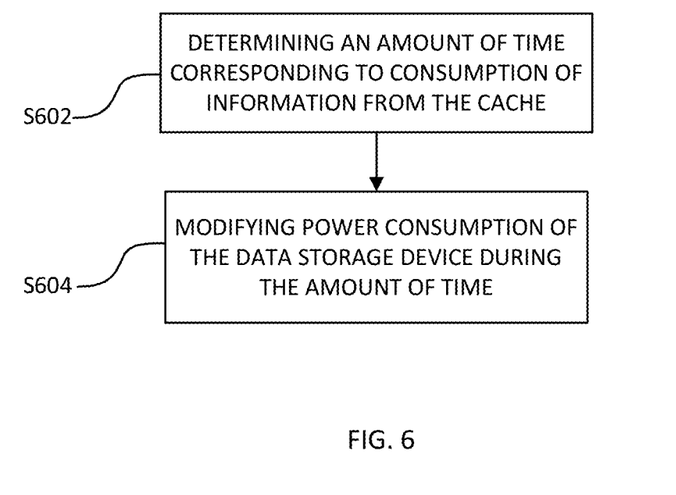
FIG. 6 depicts an additional process for caching data for a set of streams serviced from a data storage device according to an embodiment.

In an embodiment, an additional process for caching data for a set of streams serviced from a data storage device 102 is shown in FIG. 6. In block S602, the controller 102 determines an amount of time corresponding to consumption of information from the read cache 108. For example, as shown in FIG. 3, the controller 102 can determine when T1, T2, T3, and TN occur or other time points during the consumption of data from the read cache 108.

In block S604, the controller 102 modifies power consumption of the data storage device 102 during the amount of time. In an embodiment, modifying the power consumption of the data storage device 102 comprises transitioning the data storage device 102 from a first operating state to a second operating state, wherein the second operating state consumes less power than the first operating state. In an embodiment, the first operating state comprises an active state and the second operating state comprises a sleep state. In an embodiment, modifying the power consumption of the data storage device 102 comprises transitioning the data storage device from the second operating state to the first operating state when reading data to refresh the allocated Zones. In an embodiment, the data to refresh the allocated Zones can be read from the storage media 110.

In the examples disclosed above the controller 106 and/or the data storage device 102 are discussed as playing back the streams. In an embodiment, the playback of the streams need not include rendering or processing of the streams. Instead, playback of the streams can comprise transmitting data from the streams to the requesting host.

Those of ordinary skill would appreciate that the various illustrative logical blocks, modules, and algorithm parts described in connection with the examples disclosed herein may be implemented as electronic hardware, computer software, or combinations of both. Furthermore, the embodiments can also be embodied on a non-transitory machine readable medium causing a processor or computer to perform or execute certain functions.

To clearly illustrate this interchangeability of hardware and software, various illustrative components, blocks, modules, circuits, and process parts have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The parts of a method or algorithm described in connection with the examples disclosed herein may be embodied directly in hardware, in a software module executed by a processor, or in a combination of the two. The parts of the method or algorithm may also be performed in an alternate order from those provided in the examples. A software module may reside in RAM memory, flash memory, ROM memory, EPROM memory, EEPROM memory, registers, hard disk, a removable disk, an optical disk, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the disclosure is, therefore, indicated by the appended claims rather than by the foregoing description. All changes which come within the meaning and range of equivalency of the claims are to be embraced within their scope.

What is claimed is:

1. A data storage device comprising:
a hardware network interface configured to communicate with one or more clients requesting a first stream and a second stream;
a memory configured to store files associated with the first stream and the second stream;
a hardware cache; and
a processor configured to:
determine a consumption rate for each of the first stream and the second stream, the consumption rate comprising an amount of data consumed by a respective stream in a time period;
size a plurality of zones of the hardware cache, including a first zone corresponding to the first stream and a second zone corresponding to the second stream, such that refresh times of the first zone and the second zone occur during an active operation time in which the data storage device is in a first power state, wherein sizes of the first zone and the second zone are potentially different and are based on the respective consumption rate of the corresponding stream; and
cause the data storage device to enter into a second power state until the active operation time, wherein the second power state uses less power than the first power state.

2. The data storage device of claim 1, wherein the hardware network interface comprises a wireless network interface.

3. The data storage device of claim 1, further comprising a battery.

4. The data storage device of claim 1, wherein the processor is further configured to determine the consumption rate for each stream based on a requested media playback bitrate.

5. A data storage device comprising:
hardware means for communicating with one or more clients requesting a first stream and a second stream;
hardware means for storing files associated with the first stream and the second stream;
hardware means for caching; and
a processor configured to:
determine a consumption rate for each of the first stream and the second stream;
divide the hardware means for caching into a plurality of zones, including a first zone corresponding to the first stream and a second zone corresponding to the second stream, wherein sizes of the first zone and the second zone are potentially different and are based on the respective consumption rate of the corresponding stream to synchronize refresh times of the first zone and the second zone to occur during an active operation time in which the data storage device is in a first power state;
cause the data storage device to enter into a second power state until the active operation time, wherein the second power state uses less power than the first power state;
determine a current playback location for at least one of the first stream and the second stream;
retrieve a first amount of information prior to the current playback location; and
retrieve a second amount of information after the current playback location.

6. The data storage device of claim 1, wherein a size of the first zone differs from a size of the second zone.

7. The data storage device of claim 1, wherein the processor is further configured to:
cause the data storage device to enter into the first power state prior to the active operation time.

8. The data storage device of claim 7, wherein the processor is further configured to:
transfer at least a portion of the files associated with each stream from the memory to the corresponding zone for each stream in the hardware cache during the active operation time.

9. The data storage device of claim 7, wherein:
the memory comprises a data storage drive; and
causing the data storage device to enter into the first power state comprises spinning up the data storage drive.

10. The data storage device of claim 1, wherein the processor is further configured to:
refresh the first zone and the second zone of the hardware cache from the memory during the active operation time.

11. A method of caching data for a set of streams serviced from a data storage device, the method comprising:
receiving, by a controller of the data storage device, requests for a first stream and a second stream;
determining a consumption rate for each of the first stream and the second stream, the consumption rate comprising an amount of data consumed by a respective stream during a time period;
sizing a plurality of zones of a hardware cache, including a first zone corresponding to the first stream and a second zone corresponding to the second stream, such that refresh times of the first zone and the second zone occur during an active operation time in which the data storage device is in a first power state, wherein sizes of the first zone and the second zone are potentially different and are based on the respective consumption rate of the corresponding stream; and
causing the data storage device to enter into a second power state until the active operation time, wherein the second power state uses less power than the first power state.

12. The method of claim 11, wherein determining the consumption rate comprises determining a bitrate based on a requested media playback bitrate for each respective stream.

13. The method of claim 11, further comprising:
determining a current playback location for at least one of the first stream and the second stream;
retrieving a first amount of information prior to the current playback location; and
retrieving a second amount of information after the current playback location.

14. The method of claim 11, further comprising:
determining an amount of time corresponding to consumption of information from the hardware cache; and
modifying power consumption of the data storage device during the amount of time.

15. The method of claim 14, wherein modifying power consumption of the data storage device comprises transitioning the data storage device to the second power state during consumption of information from the hardware cache.

16. The method of claim 14, wherein modifying power consumption of the data storage device comprises transitioning the data storage device from the second power state to the first power state responsive to reading data to refresh the first zone and the second zone during the same active operation period.

17. The method of claim 11, wherein a size of the first zone differs from a size of the second zone.

18. The method of claim 11, further comprising:
causing the data storage device to enter into the first power state prior to the active operation time.

19. The method of claim 11, further comprising:
refreshing multiple zones of the hardware cache during the active operation time.

20. The data storage device of claim 5, wherein the processor is further configured to:
refresh the first zone and the second zone with data from the hardware means for storing files during the active operation time.

* * * * *